United States Patent
Park et al.

(10) Patent No.: US 10,771,395 B2
(45) Date of Patent: Sep. 8, 2020

(54) METHOD OF RELEASING RESOURCE RESERVATION IN NETWORK

(71) Applicants: HYUNDAI MOTOR COMPANY, Seoul (KR); KIA MOTORS CORPORATION, Seoul (KR); INDUSTRY-UNIVERSITY COOPERATION FOUNDATION HANYANG UNIVERSITY, Seoul (KR)

(72) Inventors: Seong Jin Park, Suwon-si (KR); Woo Sub Kim, Namyangju-si (KR); Ju Ho Lee, Seoul (KR); SungKwon Park, Seoul (KR)

(73) Assignees: HYUNDAI MOTOR COMPANY, Seoul (KR); KIA MOTORS CORPORATION, Seoul (KR); INDUSTRY-UNIVERSITY COOPERATION FOUNDATION HANYANG, Seoul (KR)

(*) Notice: Subject to any disclaimer, the term of this patent is extended or adjusted under 35 U.S.C. 154(b) by 504 days.

(21) Appl. No.: 15/442,048

(22) Filed: Feb. 24, 2017

(65) Prior Publication Data
US 2017/0250920 A1 Aug. 31, 2017

(30) Foreign Application Priority Data
Feb. 26, 2016 (KR) .................. 10-2016-0023723

(51) Int. Cl.
*H04L 29/08* (2006.01)
*H04L 12/911* (2013.01)
*H04W 4/48* (2018.01)
*H04L 12/46* (2006.01)

(52) U.S. Cl.
CPC .......... *H04L 47/72* (2013.01); *H04L 12/4641* (2013.01); *H04L 47/781* (2013.01); *H04L 47/824* (2013.01); *H04L 47/826* (2013.01); *H04L 67/12* (2013.01); *H04W 4/48* (2018.02)

(58) Field of Classification Search
CPC ... H04L 12/4641; H04L 47/72; H04L 47/781; H04L 47/826; H04L 67/12; H04L 47/824; H04W 4/48
See application file for complete search history.

(56) References Cited

U.S. PATENT DOCUMENTS

| 2010/0120430 A1* | 5/2010 | Hayashi | ................. H04L 12/14 455/436 |
| 2015/0365255 A1* | 12/2015 | Gunther | ............... H04N 21/647 370/401 |
| 2016/0014044 A1* | 1/2016 | Mangin | ................. H04L 47/724 370/329 |

* cited by examiner

*Primary Examiner* — Kim T Nguyen
(74) *Attorney, Agent, or Firm* — Brinks Gilson & Lione

(57) ABSTRACT

The present disclosure provides methods for releasing a reserved resource in a network. An operation method performed in a first communication node of a vehicle network includes generating a first frame including identification information of a stream transmitted through a reserved resource and a first indicator instructing to release the reserved resource; and transmitting the first frame to a second communication node.

13 Claims, 8 Drawing Sheets

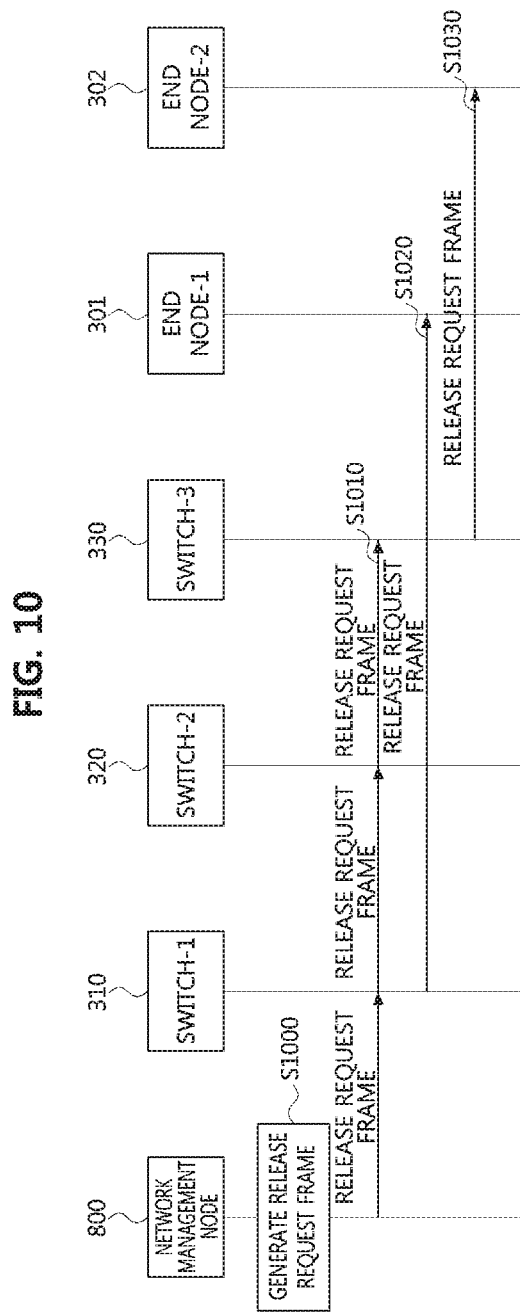

METHOD OF RELEASING RESOURCE RESERVATION IN NETWORK

CROSS-REFERENCE TO RELATED APPLICATION

This application claims the benefit of and priority to Korean Patent Application No. 10-2016-0023723, filed on Feb. 26, 2016, which is incorporated herein by reference in its entirety.

FIELD

The present disclosure relates generally to methods for releasing resource reservation, and more specifically, to methods for releasing resource reservation based on stream reservation protocol (SRP) in a vehicle network.

BACKGROUND

The statements in this section merely provide background information related to the present disclosure and may not constitute prior art.

The number and variety of electronic devices installed within a vehicle have been increasing significantly along with the recent digitalization of vehicle parts. Currently, electronic devices are used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices comprising each of these systems are connected via the vehicle network, which supports functions of the electronic devices. For instance, the CAN may support a transmission rate of up to 1 Mbps and automatic retransmission of colliding messages, error detection based on a cycle redundancy interface (CRC), or the like. The FlexRay-based network may support a transmission rate of up to 10 Mbps and simultaneous transmission of data through two channels, synchronous data transmission, or the like. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, and the like may not sufficiently support such requirements. The MOST-based network, in particular, may support a higher transmission rate than the CAN and the FlexRay-based network, although applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

In a vehicle network, an electronic device may transmit a stream based on stream reservation protocol (SRP). For example, a communication path may be configured between an electronic device (hereinafter, referred to as a 'talker') providing a service (for example, transmitting a stream related to a service) and an electronic device (hereinafter, referred to as a 'listener') receiving the service (for example, receiving the stream related to the service), and a resource for transmission of the stream may be reserved in the communication path. After completion of reservation of the resource, the talker may transmit the stream through the reserved resource. That is, the stream may be transmitted from the talker to the listener through the reserved resource. Meanwhile, a case in which the resource reserved for the communication between the talker and listener is not actually used (or, a case in which it is necessary to release the reserved resource) may occur, and the resource may be wasted unnecessarily.

SUMMARY

The present disclosure provides method for releasing resource reservation in a vehicle network.

In accordance with forms of the present disclosure, an operation method performed in a first communication node of a vehicle network may be provided. The method may comprise generating a first frame including identification information of a stream transmitted through a reserved resource and a first indicator instructing to release the reserved resource; and transmitting the first frame to a second communication node.

The resource may be reserved based on a stream reservation protocol (SRP).

The first indicator may be a declaration instructing to release the reserved resource.

The first communication node may support at least one of a multiple medium access control reservation protocol (MMRP), a multiple virtual local area network reservation protocol (MVRP), and a multiple stream reservation protocol (MSRP).

The first communication node may be a talker or a listener.

The first communication node may be a centralized network configuration (CNC) node.

The operation method may further comprise receiving a second frame indicating completion of releasing the reserved resource from the second communication node, and the second frame may include the identification information of the stream and a second indicator indicating the completion of releasing the reserved resource.

The second indicator may be a declaration indicating the completion of releasing the reserved resource.

Further, in accordance with forms of the present disclosure, an operation method performed in a first communication node of a vehicle network may be provided. The method may comprise receiving a first frame instructing to release a reserved resource, wherein the first frame includes identification information of a stream transmitted through the reserved resource; and releasing the reserved resource for the stream indicated by the identification information.

The resource may be reserved based on a stream reservation protocol (SRP).

The first communication node may support at least one of a multiple medium access control reservation protocol (MMRP), a multiple virtual local area network reservation protocol (MVRP), or a multiple stream reservation protocol (MSRP).

The first frame may further include a first indicator instructing to release the reserved resource.

The first communication node may be a switch.

The operation method may further comprise transmitting a second frame indicating completion of releasing the reserved resource to the second communication node, and the second frame may include the identification information of the stream and a second indicator indicating the completion of releasing the reserved resource.

Further, in accordance with forms of the present disclosure, a method for releasing a reserved resource, performed in a first communication node of a vehicle network, may be provided. The method may comprise monitoring a reserved resource for transmission of a stream; and releasing the reserved resource when the reserved resource is not used for a predetermined time duration.

The resource may be reserved based on a stream reservation protocol (SRP).

The first communication node may support at least one of a multiple medium access control reservation protocol (MMRP), a multiple virtual local area network reservation protocol (MVRP), or a multiple stream reservation protocol (MSRP).

The method may further comprise transmitting a first frame indicating completion of releasing the reserved resource to a second communication node, and the first frame may include identification information of the stream and a first indicator indicating the completion of releasing the reserved resource.

According to forms of the present disclosure, resource reservation based on SRP can be released, whereby waste of resources can be prevented. Also, in a case that it is required to transmit a stream (or, frame) having a relatively higher priority, resource reservation for a stream having a relatively lower priority can be released, and accordingly the transmission of the stream having the higher priority can be guaranteed. As a result, performance of the vehicle network can be enhanced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 10 is a sequence chart illustrating yet another exemplary form of a method for releasing resource reservation.

Figure 1:
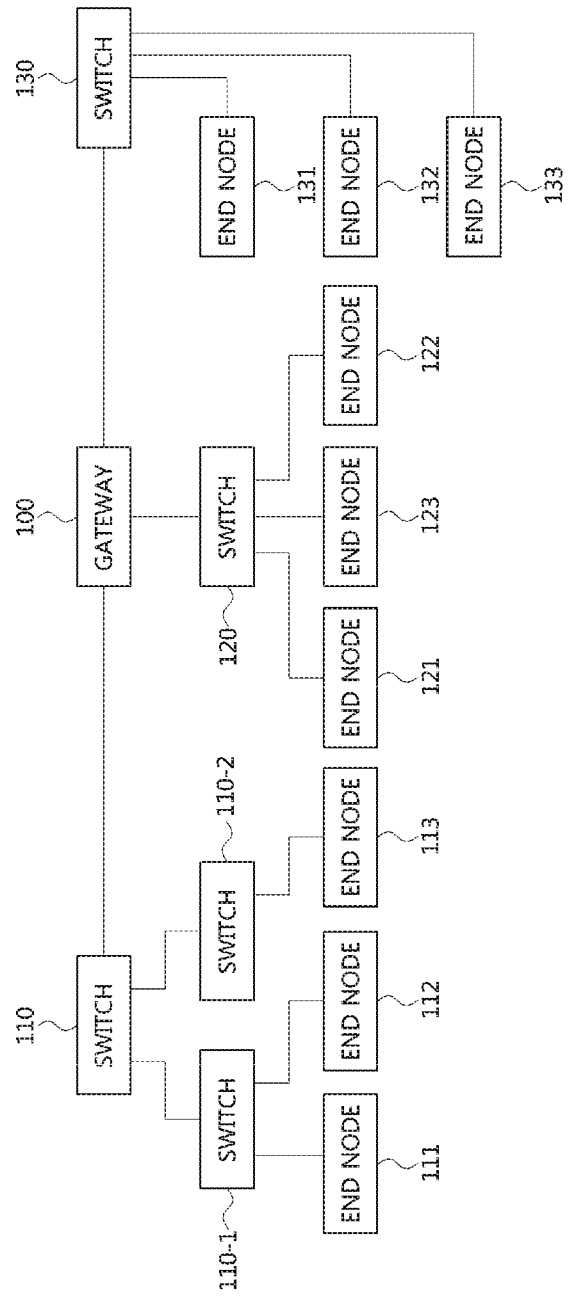
FIG. 1 is a diagram showing a vehicle network topology.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms of the present disclosure are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Further, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific forms will be shown in the accompanying drawings and be described in detail in the detailed description. It should be understood, however, that it is not intended to limit the present disclosure to the specific forms but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

FIG. 1 is a diagram showing a vehicle network topology according to a first exemplary form of the present disclosure.

As shown in FIG. 1, a communication node included in the vehicle network may be a gateway, a switch (or bridge), or an end node. The gateway 100 may be connected with at least one switch 110, 110-1, 110-2, 120, and 130 and may be configured to connect different networks. For example, the gateway 100 may support connection between a switch which supports a controller area network (CAN) (e.g., FlexRay, media oriented system transport (MOST), or local interconnect network (LIN)) protocol and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of end nodes 111, 112, 113, 121, 122, 123, 131, 132, and 133 connected to the switch.

The end nodes 111, 112, 113, 121, 122, 123, 131, 132, and 133 may include an electronic control unit (ECU) configured to control various types of devices mounted within a vehicle. For example, the end nodes 111, 112, 113, 121, 122, 123, 131, 132, and 133 may include the ECU included in an infotainment device (e.g., a display device, a navigation device, and an around view monitoring device).

The communication nodes (e.g., a gateway, a switch, an end node, or the like) included in the vehicle network may be connected in a star topology, a bus topology, a ring topology, a tree topology, a mesh topology, or the like). In addition, the communication nodes of the vehicle network may support the CAN protocol, the FlexRay protocol, the MOST protocol, the LIN protocol, or the Ethernet protocol. Forms of the present disclosure may be applied to the foregoing network topologies. The network topology to which forms of the present disclosure may be applied is not limited thereto and may be configured in various ways.

Figure 2:
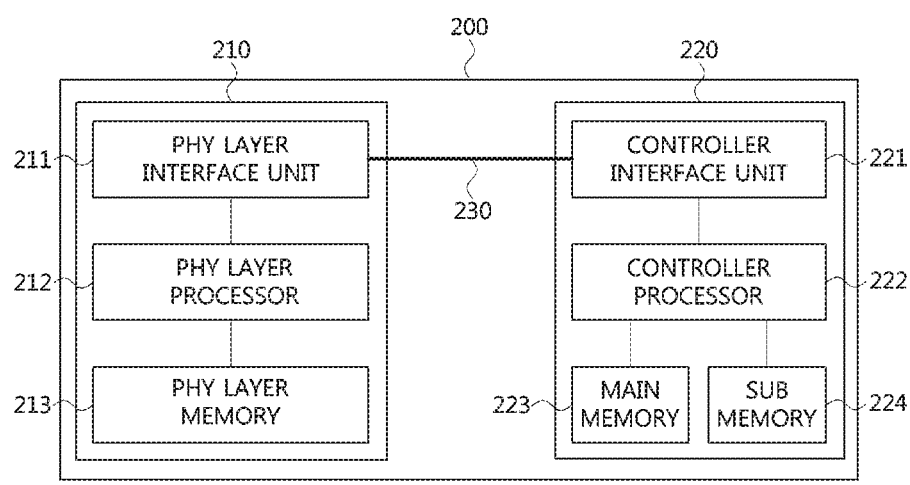
FIG. 2 is a diagram showing a communication node constituting a vehicle network.

FIG. 2 is a diagram showing a communication node constituting a vehicle network according to forms of the present disclosure. Notably, the various methods discussed herein below may be executed by a controller having a processor and a memory.

As shown in FIG. 2, a communication node 200 of a network may include a PHY layer unit 210 and a controller unit 220. In addition, the communication node 200 may further include a regulator (not shown) for supplying power. In particular, the controller unit 220 may be implemented to include a medium access control (MAC) layer. A PHY layer unit 210 may be configured to receive or transmit signals from or to another communication node. The controller unit 220 may be configured to control the PHY layer unit 210 and perform various functions (e.g., an infotainment function, or the like). The PHY layer unit 210 and the controller unit 220 may be implemented as one system on chip (SoC), or alternatively may be implemented as separate chips.

Further, the PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), and a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer unit 210 may include a PHY layer interface unit 211, a PHY layer processor 212, and a PHY layer memory 213. The configuration of the PHY layer unit 210 is not limited thereto, and the PHY layer unit 210 may be configured in various ways. The PHY layer interface unit 211 may be configured to transmit a signal received from the controller unit 220 to the PHY layer processor 212 and transmit a signal received from the PHY layer processor 212 to the controller unit 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface unit 221, a controller processor 222, a main memory 223, and a sub memory 224. The configuration of the controller unit 220 is not limited thereto, and the controller unit 220 may be configured in various ways. The controller interface unit 221 may be configured to receive a signal from the PHY layer unit 210 (e.g., the PHY layer interface unit 211) or an upper layer (not shown), transmit the received signal to the controller processor 222, and transmit the signal received from the controller processor 222 to the PHY layer unit 210 or upper layer. The controller processor 222 may further include an independent memory control logic or an integrated memory control logic for controlling the controller interface unit 221, the main memory 223, and the sub memory 224. The memory control logic may be implemented to be included in the main memory 223, and the sub memory 224 may be implemented to be included in the controller processor 222.

Further, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller unit 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

A method performed by a communication node and a corresponding counterpart communication node in a vehicle network will be described below. Although the method (e.g., signal transmission or reception) performed by a first communication node will be described below, the method is applicable to a second communication node that corresponds to the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 3:
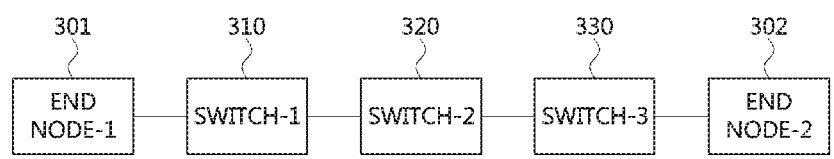
FIG. 3 is a diagram showing a vehicle network topology.
Figure 4:
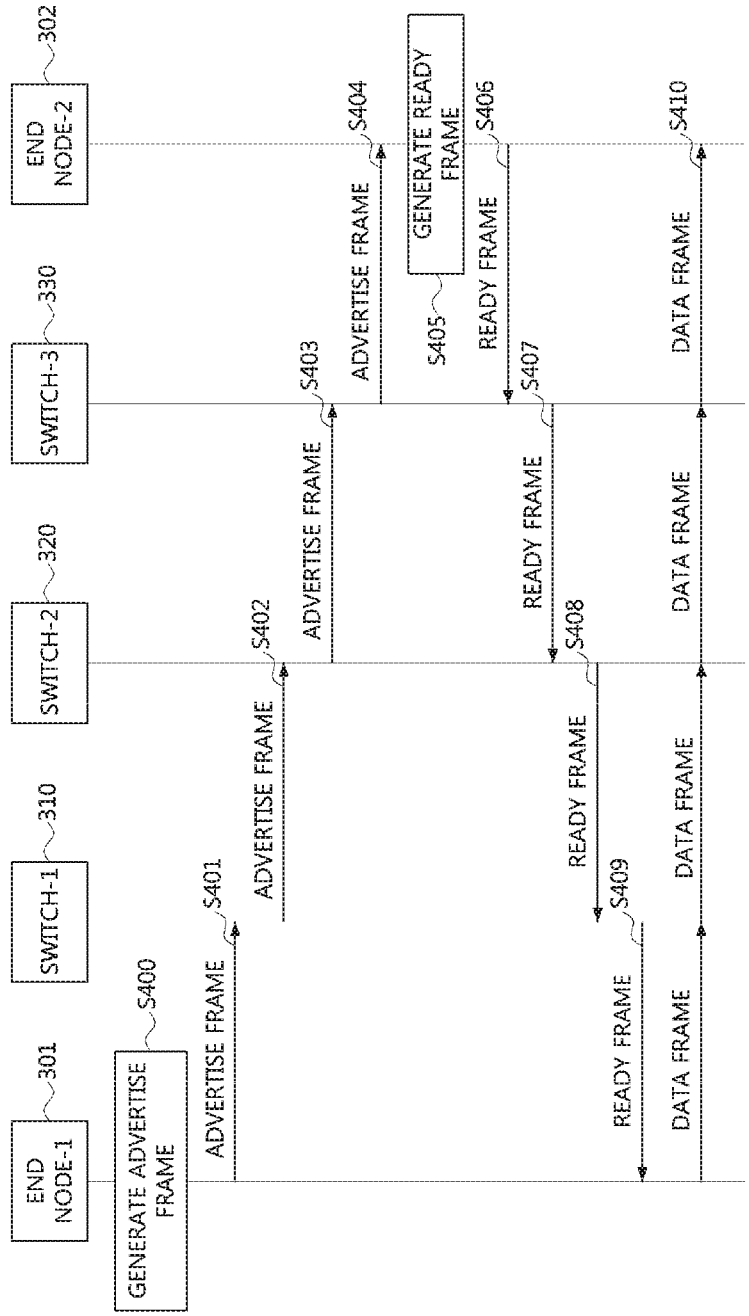
FIG. 4 is a sequence chart illustrating a frame transmission method based on a stream reservation protocol (SRP)

FIG. 3 is a diagram showing a vehicle network topology according to a second exemplary form of the present disclosure, and FIG. 4 is a sequence chart illustrating a frame transmission method based on a stream reservation protocol (SRP).

Referring to FIG. 3 and FIG. 4, each of communication nodes 301, 302, 310, 320, and 330 may have a structure identical to or similar with that of the communication node 200 explained in FIG. 2, and may support a multiple MAC reservation protocol (MMRP), a multiple virtual local area network reservation protocol (MVRP), a multiple SRP (MSRP) and so on. The end node 301 may be a talker providing a service (e.g., transmitting a stream related to a service), and the end node 302 may be a listener being served by the talker (e.g., receiving the stream related to the service). Each of the switches 310, 320, and 330 may be a bridge. Here, the stream may comprise a plurality of sequential frames. The frame may include audio video bridging (AVB) data, and the AVB data may be data defined according to the AVB specification.

The data included in the frame may have a priority, and the priority may be classified into stream reservation (SR) classes, best effort (BE) classes, etc. The priorities of the SR classes may be higher than those of the BE classes. The SR classes may include a SR class A and a SR class B, and the priority of the SR class A is identical to or higher than that of the SR class B. The priority of the AVB data may be assigned to the SR class A or the SR class B. The following table 1 shows priorities of respective classes.

TABLE 1

| | The number of priority levels | | | | | | |
|---|---|---|---|---|---|---|---|
| | 2 | 3 | 4 | 5 | 6 | 7 | 8 |
| BE classes | 0 | 0 | 0 | 0 | 0 | 0 | 1 |
| | 0 | 0 | 0 | 0 | 0 | 0 | 0 |
| SR class B | 1 | 1 | 2 | 3 | 4 | 5 | 6 |
| SR class A | 1 | 2 | 3 | 4 | 5 | 6 | 7 |
| BE classes | 0 | 0 | 1 | 1 | 1 | 1 | 2 |
| | 0 | 0 | 1 | 1 | 1 | 2 | 3 |
| | 0 | 0 | 1 | 2 | 2 | 3 | 4 |
| | 0 | 0 | 1 | 2 | 3 | 4 | 5 |

A higher priority level may indicate a higher priority. In the case that two priority levels (0, 1) are used, priority levels of the SR classes A and B may be set to '1', and priority levels of the BE classes may be set to '0'. In the case that three priority levels (0, 1, 2) are used, the priority level of the SR class A may be set to '2', the priority level of the SR class B may be set to '1', and the priority level of the BE classes may be set to '0'. In the case that four priority levels (0, 1, 2, 3) are used, the priority level of the SR class A may be set to '3', the priority level of the SR class B may be set to '2', and the priority levels of the BE classes may be set to '1' or '0'. In the case that five priority levels (0, 1, 2, 3, 4) are used, the priority level of the SR class A may be set to '4', the priority level of the SR class B may be set to '3', and the priority levels of the BE classes may be set to '2', '1' or '0'.

In the case that six priority levels (0, 1, 2, 3, 4, 5) are used, the priority level of the SR class A may be set to '5', the priority level of the SR class B may be set to '4', and the priority levels of the BE classes may be set to '3', '2', '1' or '0'. In the case that seven priority levels (0, 1, 2, 3, 4, 5, 6) are used, the priority level of the SR class A may be set to '6', the priority level of the SR class B may be set to '5', and the priority levels of the BE classes may be set to '4', '3', '2', '1' or '0'. In the case that eight priority levels (0, 1, 2, 3, 4, 5, 6, 7) are used, the priority level of the SR class A may be set to '7', the priority level of the SR class B may be set to '6', and the priority levels of the BE classes may be set to '5', '4', '3', '2', '1' or '0'.

Meanwhile, the end node 301 may generate an advertise frame for notifying provisioning of the service (e.g., transmitting the stream related to the service) (S400). The advertise frame may include at least one of information elements listed in the following table 2.

TABLE 2

| Information Element | Content |
|---|---|
| Stream ID | Identifier of a specific stream |
| Declaration type | a declaration type of a talker and a listener |
| Data frame parameter | destination address and VLAN ID of the frame |
| Traffic specification | the maximum size of a frame and the maximum interval between frames |
| Data frame priority | a priority of the frame used in a queue |
| Rank | a priority of the stream |
| Accumulated latency | Latency in a communication path between a talker and a listener |
| Failure information | Identifier of a switch (or, bridge) which fails resource reservation, and failure code |

Information elements included in the advertise frame may be configured as follows.

Figure 5:
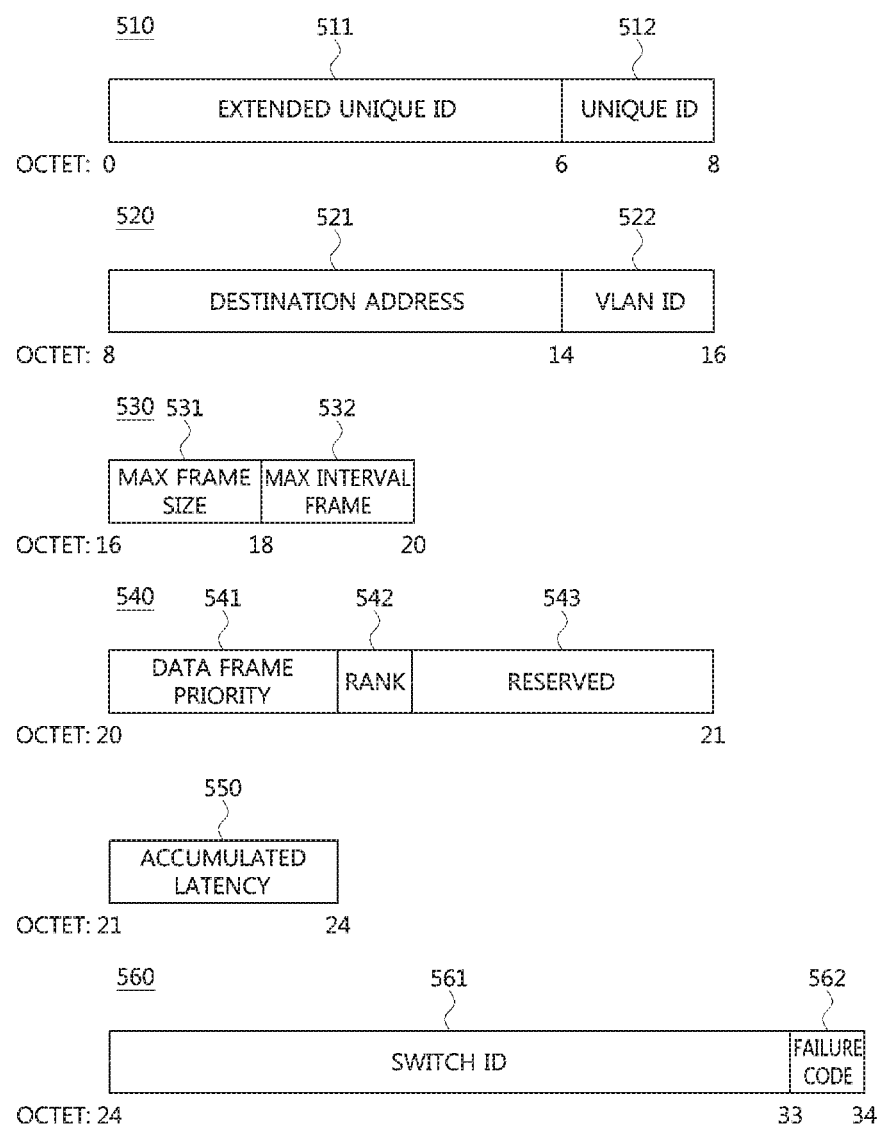
FIG. 5 is a block diagram illustrating information elements included in an advertise frame.

FIG. 5 is a block diagram illustrating information elements included in an advertise frame.

Referring to FIG. 5, a stream identifier (ID) field 510 may comprise an extended unique identifier (EUI) (or, MAC address) field 511 having the length of 6 octets, and a unique identifier (UI) field 512 having the length of 2 octets. The EUI field 511 may indicate a specific vehicle system (e.g., a power train control system, a body control system, a chassis control system, a multimedia system and so on). The UI field 512 may be used for discriminating streams in the specific vehicle system indicated by the EUI field 511.

A data frame parameter field 520 may comprise a destination address field 521 having the length of 6 octets and a VLAN ID field 522 having the length of 2 octets. The destination address field 521 may indicate a MAC address of the end node 302. The VLAN ID field 522 may indicate a VLAN to which the end node 301 (or, the end node 302) belongs.

A traffic specification field 530 may comprise a max frame size field 531 having the length of 2 octets, and a max interval frame field 532 having the length of 2 octets. The max frame size field 531 may indicate the maximum size of a frame. The max interval frame field 532 may indicate the maximum interval between frames.

A priority/rank field 540 may comprise a data frame priority field 541 having the length of 3 bits, a rank field 542 having the length of 1 bit, and a reserved field 543 having the length of 4 bits. The data frame priority field 541 may indicate a priority of the frame (or, data included in the frame), which is used in a queue, and may indicate one of the priority levels explained referring to the table 1. The rank field 542 may indicate a priority of the stream.

For example, the switches 310, 320, and 330 may receive requests of reserving resources (e.g., bandwidth) for transmitting a plurality of streams (e.g., a first stream and a second stream), and reserve respective resources for the plurality of streams, if they can process the plurality of stream by using their available resources. However, if the switches 310, 320, and 330 cannot process all of the plurality of streams by using their available resources, they may identify respective ranks of the plurality of streams. The switches 310, 320, and 330 may reserve resources for the streams having relatively higher ranks, and may not reserve resources for the streams having relatively lower ranks.

An accumulated latency field 550 may have the length of 3 octets, and indicate a latency occurring in a communication path between the talker (e.g., the end node 301) and the listener (e.g., the end node 302). A failure information field 560 may comprise a switch ID field 561 having the length of 9 octets, and a failure code field 562 having the length of 1 octet. The switch ID field 561 may indicate a switch (or, bridge) which failed resource reservation. The failure code field 562 may indicate the type of the resource reservation failure.

A declaration type may be classified into "talker advertise declaration", "talker failed declaration", "listener ready declaration", "listener ready failed declaration", "listener asking failed declaration", etc. The "talker advertise declaration" may indicate that the talker is to provide a service. The "talker failed declaration" may indicate that a service cannot be provided (e.g., due to a failure of resource reservation). The "listener ready declaration" may indicate that the listener can receive a service. The "listener ready failed declaration" may indicate that the listener cannot receive a service. The "listener asking failed declaration" may indicate a situation in which a listener can receive a service even though the listener receives a frame indicating the "talker failed declaration".

Re-referring to FIG. 3 and FIG. 4, the declaration type of the advertise frame may be set to "talker advertise declaration", and a destination address of the advertise frame may be set to the MAC address of the end node 302. The end node 301 may transmit the advertise fame to the switch 310 (S401). The switch 310 may receive the advertise frame from the end node 301. Since the received advertise frame indicates the "talker advertise declaration", the switch 310 may identify that the end node 301 is to provide a service.

Accordingly, the switch 310 may identify whether or not a resource for processing a stream (e.g., a stream related to the service) of the end node 301 is available. For example, the switch 310 may calculate the amount of resource needed for processing the stream based on the traffic specification field included in the advertise frame, and transmit the advertise frame to the switch 320 when the resource corresponding to the calculated amount is available (S402). Also, the switch 310 may register a stream ID indicated by the advertise frame in its database. On the contrary, when the resource corresponding to the calculated amount does not exist, the switch 310 may generate a failed frame indicating "talker failed declaration", and transmit the failed frame to the end node 301. Upon receiving the failed frame, the end node 301 may identify that the service cannot be provided (e.g., due to the failure of resource reservation).

The switch 320 may receive the advertise frame from the switch 310. The switch 320 may operate identically to or similarly with the switch 310. Thus, the switch 320 may identify that the end node 301 is to provide a service, and transmit the advertise frame to the switch 330 when a resource needed for processing the stream of the end node 301 is available (S403). Also, the switch 320 may also register the stream ID indicated by the advertise frame in its database. On the contrary, when the resource needed for processing the stream of the end node 301 is not available, the switch 320 may transmit a failed frame indicating "talker failed declaration" to the switch 310. The failed frame may be transmitted to the end node 301 through the switch 310.

The switch 330 may receive the advertise frame from the switch 320. The switch 330 may operate identically to or similarly with the switch 310. Thus, the switch 330 may identify that the end node 301 is to provide a service, and transmit the advertise frame to the end node 302 when a resource needed for processing the stream of the end node 301 is available (S404). Also, the switch 330 may register the stream ID indicated by the advertise frame in its database. On the contrary, when the resource needed for processing the stream of the end node 301 is not available, the switch 330 may transmit a failed frame indicating "talker failed declaration" to the switch 320. The failed frame may be transmitted to the end node 301 through the switches 320 and 310.

The end node 302 may receive the advertise frame from the switch 330. Since the advertise frame indicates "talker advertise declaration", the end node 302 may identify that the end node 301 is to provide a service. In a case that the end node 302 wants to receive the service from the end node 301 (e.g., when the end node 302 wants to receive the stream related to the service), the end node 302 may generate a ready frame including "listener ready declaration" indicating that the end node 302 wants to receive the service (S405). The end node 302 may transmit the ready frame to the switch 330 (S406). The ready frame may include at least one of the information elements explained referring to the table 1. The stream ID indicated by the ready frame may be identical to the stream ID indicated by the advertise frame. A destination address of the ready frame may be set to the MAC address of the end node 301.

On the contrary, in a case that the end node 302 does not want to receive the service from the end node 301, the end node 302 may generate a failed frame including "listener ready failed declaration" indicating that the end node 302 does not want to receive the service. The end node 302 may transmit the failed frame to the switch 330. The failed frame may be transmitted to the end node 301 through the switches 330, 320, and 310. The end node 301 may receive the failed frame from the switch 310, and identify that the end node 302 does not want to receive the service, based on the failed frame.

The switch 330 may receive the ready frame from the end node 302. Since the ready frame indicates "listener ready declaration", the switch 330 may identify that the end node 302 wants to receive the service. The switch 330 may identify the stream ID indicated by the ready frame, and check whether or not the stream ID corresponding to the identified stream ID exists in its database. In a case that the stream ID identical to the stream ID indicated by the ready frame exists in the database, the switch 330 may allocate an output port (e.g., a port connected to the end node 302) and a resource for transmission of the stream indicated by the stream ID. The switch 330 may transmit the ready frame to the switch 320 (S407).

The switch 320 may receive the ready frame from the switch 330. The switch 320 may operate identically to or similarly to the switch 330. Therefore, the switch 320 may identify that the end node 302 wants to receive the service, and allocate an output port (e.g., a port connected to the switch 330) and a resource for transmission of the stream indicated by the stream ID, when the stream ID identical to the stream ID indicated by the ready frame exists in the data base. The switch 320 may transmit the ready frame to the switch 310 (S408).

The switch 310 may receive the ready frame from the switch 320. The switch 310 may operate identically to or similarly to the switch 330. Therefore, the switch 310 may identify that the end node 302 wants to receive the service, and allocate an output port (e.g., a port connected to the switch 320) and a resource for transmission of the stream indicated by the stream ID, when the stream ID identical to the stream ID indicated by the ready frame exists in the data base. The switch 310 may transmit the ready frame to the end node 301 (S409).

The end node 301 may receive the ready frame from the switch 310. Since the ready frame indicates "listener ready declaration", the end node 301 may identify that the end node 302 wants to receive the service. Also, the end node 301 may identify that the reservation of a resource for the communication between itself and the end node 302 is completed. Accordingly, the end node 301 may generate a frame including data (e.g., AVB data), and transmit the generated frame to the end node 302 (S410). The frame may be transmitted to the end node 302 through the switches 320 and 330 (that is, through the reserved resource).

Meanwhile, in the case that the resource has been reserved as described above, it may become necessary to release the reserved resource. For example, when a resource having better communication quality (e.g., Quality of Service (QoS)) than that of the reserved resource exists, when the reserved resource is not used for a predetermined time duration (i.e., when the reserved resource is wasted), or when a frame having higher priority than that of the frame which is to be transmitted through the reserved resource is required to be transmitted, it may become necessary to release the reserved resource. Hereinafter, a method for releasing resource reservation (e.g., the resource reservation according to the method explained in FIG. 3 and FIG. 4) will be described.

Figure 6:
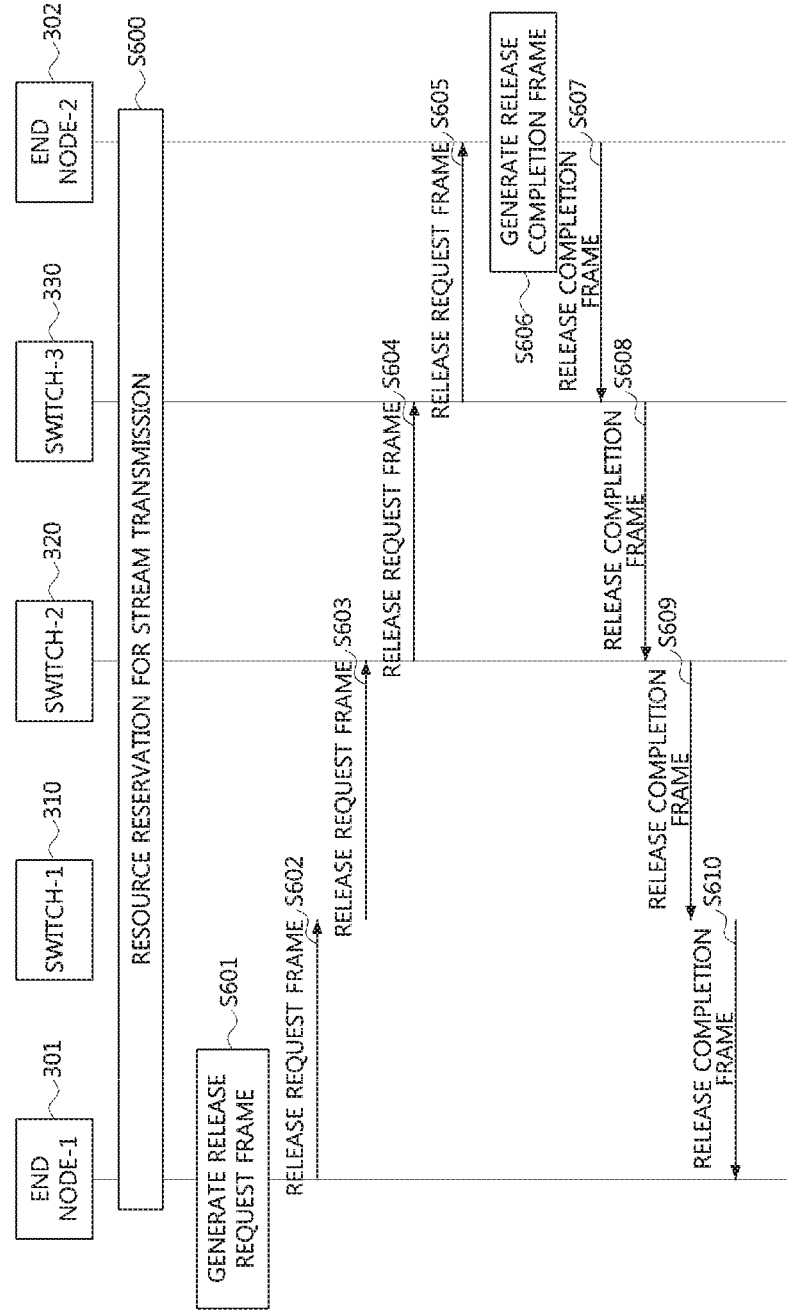
FIG. 6 is a sequence chart illustrating an exemplary form of a method for releasing resource reservation.

FIG. 6 is a sequence chart illustrating an exemplary form of a method for releasing resource reservation according to the present disclosure.

Referring to FIG. 6, the end node 301 and 302, and the switches 310, 320, and 330 may correspond to the end nodes 301 and 302, and the switches 310, 320, and 330, and may constitute the vehicle network illustrated in FIG. 3. The end node may be a talker providing a service, and the end node 302 may be a listener receiving a service from the talker. When the end node 301 wants to provide a service to the end node 302, a resource to be used for transmitting a stream related to the service may be reserved (S600). For example, a resource for communications between the end node 301 and the end node 302 may be reserved based on the method (e.g., S400 to S409) explained in FIG. 3 and FIG. 4.

A method for releasing the resource reservation may be initiated by the end node 301 which is the talker or the end node 302 which is the listener. For example, the end node 301 may release the resource reservation when the reserved resource cannot be used or when the service cannot be provided. The end node 302 may release the resource reservation when the reserved resource cannot be used or when the service cannot be received. In the below description, a method for releasing resource reservation, which is initiated by the end node 301, will be explained. However, the end node 302 may release resource reservation identically to or similarly with a method which will be described.

The end node 301 may generate a release request frame requesting to release resource reservation (S601), and transmit the release request frame to the switch 310 (S602). The release request frame may comprise a stream ID and a release request indicator requesting to release resource reservation. A destination address of the release request frame may be the MAC address of the end node 302. The stream ID included in the release request frame may be identical to the stream ID included in the advertise frame transmitted from the end node 301 in the step S600. The release request indicator may request to release the reserved resource for transmission of the stream indicated by the stream ID. Meanwhile, "release request declaration", as one of the declaration types explained referring to the table 2, may be defined, and the "release request declaration" may indicate a request of the resource reservation. In this case, the release request indicator may be "release request declaration", and a value for the "release request declaration" may be set to 0x05.

The switch 310 may receive the release request frame from the end node 301. Based on the release request indicator (e.g., "release request declaration") included in the release request frame, the switch 310 may identify that the release of the resource reservation has been requested. Accordingly, the switch 310 may release the resource reserved for transmission of the stream indicated by the stream ID included in the release request frame. The switch 310 may transmit the release request frame to the switch 320 (S603).

The switch 320 may receive the release request frame from the switch 310, and operate identically to or similarly with the switch 310. For example, the switch 320 may release the resource reserved for transmission of the stream indicated by the stream ID included in the release request frame, and transmit the release request frame to the switch 330 (S604). The switch 330 may receive the release request frame from the switch 320, and operate identically to or similarly with the switch 310. For example, the switch 330 may release the resource reserved for transmission of the stream indicated by the stream ID included in the release request frame, and transmit the release request frame to the end node 302 (S605).

The end node 302 may receive the release request frame from the switch 330. Upon receiving the release request frame, the end node 302 may identify that the resource reserved for transmission of the stream indicated by the stream ID included in the release request frame has been released. That is, the end node 302 may identify that the resource reservation for the communication between it and the end node 301 has been released.

Also, the end node 302 may generate a release completion frame for notifying completion of releasing resource reservation (S606), and transmit the release completion frame to the switch 330 (S607). The release completion frame may comprise a stream ID and a release completion indicator indicating completion of releasing resource reservation. A destination address of the release completion frame may be the MAC address of the end node 301. The stream ID included in the release completion frame may be identical to the stream ID included in the release request frame. The release completion indicator may indicate that the release of the resource for transmission of the stream indicated by the stream ID has been completed. Meanwhile, "release completion declaration", as one of the declaration types explained in the table 2, may be defined, and the "release completion declaration" may indicate completion of releasing the resource reservation. That is, the release completion indicator may be "release completion declaration".

The switch 330 may receive the release completion frame from the end node 302. The switch 330 may identify the stream ID and the release completion indicator included in the release completion frame, and identify that the resource reservation for transmission of the stream indicated by the stream ID has been released. The switch 330 may transmit the release completion frame to the switch 320 (S608). The switch 320 may receive the release completion frame from the switch 330, and operate identically to or similarly with the switch 330. Therefore, based on the release completion frame, the switch 320 may identify that that the resource reservation for transmission of the stream indicated by the stream ID has been released, and transmit the release completion frame to the switch 310 (S609). The switch 310 may receive the release completion frame from the switch 320, and operate identically to or similarly with the switch 320. Therefore, based on the release completion frame, the switch 321 may identify that that the resource reservation for transmission of the stream indicated by the stream ID has been released, and transmit the release completion frame to the end node 301 (S610).

The end node 301 may receive the release completion frame from the switch 310. The end node 301 may identify the stream ID and the release completion indicator included in the release completion frame, and identify that the resource reservation for transmission of the stream indicated by the stream ID has been released. Here, the steps for transmitting and receiving the release completion frame (for example, the steps S606 to S610) may be omitted.

Figure 7:
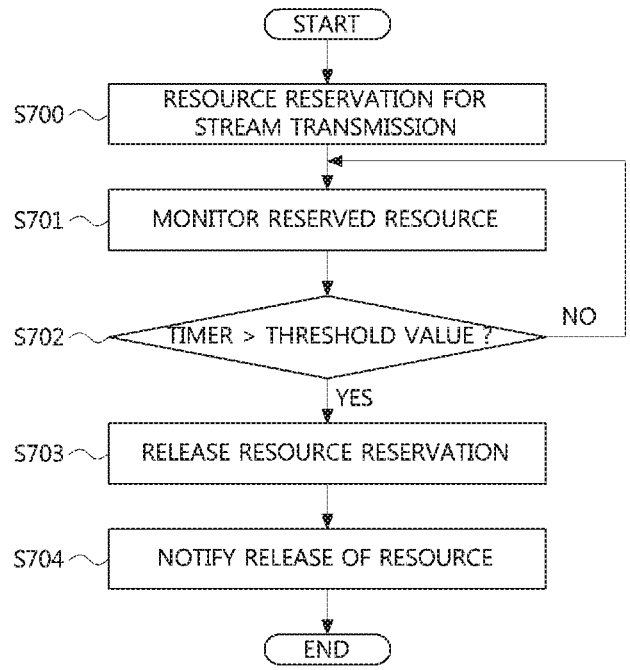
FIG. 7 is a sequence chart illustrating another exemplary form of a method for releasing resource reservation.

FIG. 7 is a sequence chart illustrating another exemplary form of a method for releasing resource reservation according to the present disclosure.

Referring to FIG. 7, communication nodes for perform a method for releasing resource reservation may be the end nodes 301 and 302 and the switches 310, 320, and 330, and constitute the vehicle network illustrated in FIG. 3. The communication nodes constituting the vehicle network may operate based on synchronized time. The communication nodes may reserve a resource for transmission of a stream as explained in FIG. 3 and FIG. 4, for example, through the steps S400 to S409 (S700).

The communication node may check whether or not the stream is transmitted through the reserved resource by monitoring the reserved resource after completion of the resource reservation (S701). For example, the communication node may initialize a timer (e.g., setting a value of the timer to 0), and monitor the reserved resource after the initialization of the timer. The timer may be used for counting time during the reserved resource is not used. The time at which the timer is initialized is a start time point at which the reserved resource is to be used. The initialization time may be explicitly indicated by at least one of the advertise frame and the ready frame. For example, the advertise frame (or, the ready frame) may include information indicating the initialization time of the timer. The communication node receiving the advertise frame (or, the ready frame) may identify the initialization time of the timer based on the received advertise frame (or, the ready frame), and initialize the timer at the initialization time.

The communication node may reset the timer when the stream is transmitted through the reserved resource, and continue counting (increasing) of the timer while the stream is not transmitted through the reserved resource. The communication node may compare the value of the timer with a threshold value (S702). The threshold value may indicate a time point at which the reserved resource is released, and may mean an offset value from the initialization time of the timer. The threshold value may be obtained from an upper communication node (e.g., a gateway, etc.) when configuring the vehicle network. Alternatively, the threshold value may obtained from at least one of the advertise frame and the ready frame. For example, the advertise frame (or, the ready frame) may include information indicating the threshold value. The communication node receiving the advertise frame (or, the ready frame) may identify the threshold value based on the information included in the advertise frame (or, the ready frame).

The communication node may release the reserved resource when the counted value of the timer is larger than the threshold value (S703). Also, when release of the reserved resource is completed, the communication node may generate a release completion frame indicating completion of the reserved resource, and transmit the release completion frame to at least one of the talker and the listener (S704). Here, the release completion frame may be identical to or similar with the release completion frame explained in FIG. 6. For example, the release completion frame may comprise a stream ID and a release completion indicator (or, "release completion declaration").

Figure 8:
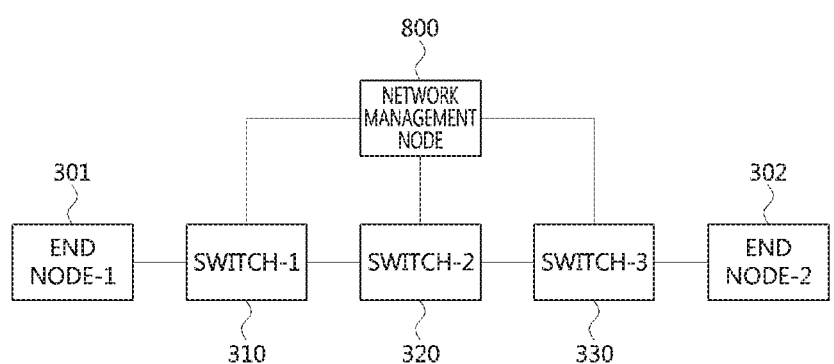
FIG. 8 is a diagram showing a vehicle network topology.

FIG. 8 is a diagram showing a vehicle network topology according to a third exemplary form of the present disclosure.

Referring to FIG. 8, a vehicle network may comprise the end nodes 301 and 302, the switches 310, 320, and 330, and a network management node 800. That is, the vehicle network illustrated in FIG. 8 may further comprise the network management node 800 as compared to the vehicle network illustrated in FIG. 3. The end nodes 301 and 302 and the switches 310, 320, and 330 may correspond to the end nodes 301 and 302 and the switches 310, 320, and 330 which were explained in FIG. 3. The end node 301 may be a talker, and the end node 302 may be a listener.

The network management node 800 may manage and control the switches 310, 320, and 330. The network management node 800 may be a centralized network configuration (CNC) node defined in the IEEE 802.1Qcc. In the vehicle network, the network management node 800 may be a separate entity other than the end nodes 301 and 302 and the switches 310, 320, and 330. Alternatively, one of the end nodes 301 and 302 and the switches 310, 320, and 330 may perform functions of the network management node 800. Meanwhile, when communications between the end node 301 and the end node 302 are requested, the network management node 800 may configure a communication path between the end nodes 301 and 302 and reserve a resource for transmission of a stream, by identifying capabilities (e.g., available resources, latencies, etc.) of the respective switches 310, 320, and 330.

The network management node 800 may inform the switches 310, 320, and 330 of the resource reserved for the transmission of the stream. The switch 310 (i.e., a switch adjacent to the end node 301) may notify the reserved resource to the end node 301, and the switch 330 (i.e., a switch adjacent to the end node 302) may notify the reserved resource to the end node 302. The communications between the end node 301 and the end node 302 may be performed through the reserved resource.

Figure 9:
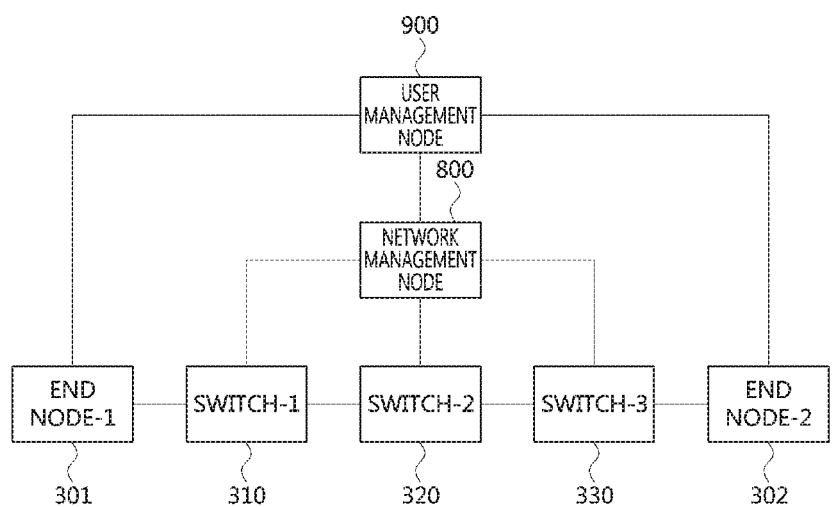
FIG. 9 is a diagram showing a vehicle network topology.

FIG. 9 is a diagram showing a vehicle network topology according to a fourth exemplary form of the present disclosure.

Referring to FIG. 9, a vehicle network may comprise the end nodes 301 and 302, the switches 310, 320, and 330, a network management node 800, and a user management node 900. That is, the vehicle network illustrated in FIG. 9 may further comprise the user management node 900 as compared to the vehicle network illustrated in FIG. 8. The end nodes 301 and 302, the switches 310, 320, and 330, and the network management node 800 may correspond to the end nodes 301 and 302, the switches 310, 320, and 330, and the network management node 800 which were explained in FIG. 3. The end node 301 may be a talker, and the end node 302 may be a listener.

The user management node 900 may manage and control the end nodes 301 and 302. The user management node 900 may be a centralized user configuration (CUC) node defined in the IEEE 802.1Qcc. In the vehicle network, the user management node 900 may be a separate entity other than the end nodes 301 and 302 and the switches 310, 320, and 330. Alternatively, one of the end nodes 301 and 302 and the switches 310, 320, and 330 may perform functions of the user management node 900. Meanwhile, the user management node 900 may receive a frame indicating that the end node 301 is to provide a service from the end node 301, and transmit the received frame to the end node 302. Also, when the user management node 900 receives a frame indicating that end node 302 is able to receive the service from the end node 302, the user management node 900 may request the network management 800 to reserve a resource for the service. The network management node 800 may configure a communication path between the end nodes 301 and 302 and reserve a resource for transmission of a stream for the service, by identifying capabilities (e.g., available resources, latencies, etc.) of the respective switches 310, 320, and 330.

The network management node 800 may inform the resource reserved for the transmission of the stream to the user management node 900 and the switches 310, 320, and 330. The user management node 900 may receive the notified information on the reserved resource from the network management node 800, and notify the information on the reserved resource to the end nodes 301 and 302. The communications between the end node 301 and the end node 302 may be performed through the reserved resource.

Hereinafter, a method for releasing resource reservation in the vehicle networks explained in FIG. 8 and FIG. 9 will be described.

FIG. 10 is a sequence chart illustrating yet another exemplary form of a method for releasing resource reservation according to the present disclosure.

Referring to FIG. 10, the end nodes 301 and 302, the switches 310, 320, and 330, and the network management node 800 may correspond to the end nodes 301 and 302, the switches 310, 320, and 330, and the network management nod 800, and constitute the vehicle networks explained in FIG. 8 and FIG. 9. The end node 301 may be a talker providing a service, and the end node 302 may be a listener receiving the service from the talker.

When communications between the end node 301 and the end node 302 are required, the network management node 800 may configure a communication path between the end nodes 301 and 302 in consideration of capabilities of the switches 310, 320, and 330, and reserve a resource in the communication path. The communication path may be configured to be 'end node 301-switch 310-switch 320-switch 330-end node 302'. The network management node 800 may transmit, to the switches 310, 320, and 330, information on the configured communication path and the reserved resource. The switch 310 connected to the end node 301 may transmit the information to the end node 301, and the switch 330 connected to the end node 302 may transmit the information to the end node 302. The communications between the end node 301 and the end node 302 may be performed through the reserved resource and the configured communication path.

Meanwhile, in the case that the resource has been reserved as described above, it may become necessary to release the reserved resource. For example, when a resource having better communication quality (e.g., Quality of Service (QoS)) than that of the reserved resource exists, when the reserved resource is not used for a predetermined time duration (e.g., when the counted value of the timer is larger than the threshold value in the step S702 of FIG. 7), or when a frame having higher priority than that of the frame which is to be transmitted through the reserved resource is required to be transmitted, it may become necessary to release the reserved resource.

In this case, the network management node 800 may generate a release request frame requesting to release the reserved resource (S1000), and transmit the release request frame to the switches 310, 320, and 330 (S1010). The release request frame may comprise a stream ID and a release request indicator requesting to release resource reservation. The stream ID included in the release request frame may be an identifier of the stream transmitted through the resource reserved by the network management node 800. The release request indicator may request to release the reserved resource for transmission of the stream indicated by the stream ID. The release request indicator may be "release request declaration", and a value for the "release request declaration" may be set to 0x05.

The switches 310, 320, and 330 may receive the release request frame from the network management node 800. Based on the release request indicator (e.g., "release request declaration") included in the release request frame, the switches 310, 320, and 330 may identify that the release of the resource reservation has been requested. Accordingly, the switches 310, 320, and 330 may release the resource reserved for transmission of the stream indicated by the stream ID included in the release request frame.

The switch 310 connected to the end node 301 may transmit the release request frame to the end node 301 (S1020). Upon receiving the release request frame, the end node 301 may identify that the resource reserved for the communication between itself and the end node 302 has been released. The switch 330 connected to the end node 302 may transmit the release request frame to the end node 302 (S1030). Upon receiving the release request frame, the end node 302 may identify that the resource reserved for the communication between itself and the end node 301 has been released.

On the other hand, in the case of the vehicle networking comprising the user management node 900, the network management node 800 may also transmit the release request frame to the user management node 900. Upon receiving the release request frame, the user management node 900 may identify that the release of the resource reserved for the communication between the end nodes 301 and 302 has been requested. Then, the user management node 900 may transmit the release request frame to the end nodes 301 and 302. That is, in the case that the vehicle network comprises the user management node 800, the end nodes 301 and 302 may receive the release request frame from the user management node 900 instead of the switches 310 and 330. Upon receiving the release request frame, the end nodes 301 and 302 may identify that the resource reservation for the communication between them has been released.

The methods according to forms of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An operation method performed in a first communication node of a vehicle network, the method comprising:
   transmitting an advertisement frame, comprising priority information of a first stream, to reserve resource for a first stream;
   generating the first frame comprising identification information based on the priority information of the first stream;
   transmitting the first frame to a second communication node; and
   receiving a second frame configured to indicate a completion of a release of a reserved resource between the first communication node and the second communication node from the second communication node,
   wherein the first frame instructs to release the reserved resource,
   wherein the second frame includes the identification information of the first stream,
   wherein the identification information identifies the first stream transmitting through the reserved resource, and
   wherein the identification information further indicates the reserved resource for the first stream among the reserved resources for each stream.

2. The operation method according to claim 1, wherein the reserved resource is reserved based on a stream reservation protocol (SRP).

3. The operation method according to claim 1, wherein the first frame further comprises a first indicator configured to instruct that the reserved resource be released.

4. The operation method according to claim 1, wherein the first communication node supports at least one of a multiple medium access control reservation protocol (MMRP), a multiple virtual local area network reservation protocol (MVRP), or a multiple stream reservation protocol (MSRP).

5. The operation method according to claim 1, wherein the first communication node is a talker or a listener.

6. The operation method according to claim 1, wherein the first communication node is a centralized network configuration (CNC) node.

7. An operation method performed in a first communication node of a vehicle network, the method comprising:
   receiving an advertisement frame comprising priority information of a first stream to reserve resource for the first stream;
   receiving a first frame comprising identification information of the first stream transmitted through a reserved resource based on the priority information of the first stream;
   releasing the reserved resource for the first stream indicated by the identification information; and
   transmitting a second frame configured to indicate a completion of a release of the reserved resource between the first communication node and a second communication node to the second communication node,
   wherein the first frame instructs to release the reserved resource based on a monitoring result of the reserved resource,
   wherein the second frame comprises the identification information of the first stream and
   wherein the identification information further indicates the reserved resource for the first stream among the reserved resources for each stream.

8. The operation method according to claim 7, wherein the reserved resource is reserved based on a stream reservation protocol (SRP).

9. The operation method according to claim 7, wherein the first communication node supports at least one of a multiple medium access control reservation protocol (MMRP), a multiple virtual local area network reservation protocol (MVRP), or a multiple stream reservation protocol (MSRP).

10. The operation method according to claim 7, wherein the first frame further comprises a first indicator configured to instruct that the reserved resource be released.

11. The operation method according to claim 7, wherein the first communication node is a switch.

12. An operation method performed in a first communication node of a vehicle network, the method comprising:
- transmitting an advertisement frame, comprising priority information of a first stream, to reserve resource for a first stream;
- generating the first frame comprising identification information based on the priority information of the first stream;
- transmitting the first frame to a second communication node; and
- receiving a second frame configured to indicate a completion of a release of a reserved resource between the first communication node and the second communication node from the second communication node,
- wherein the first frame instructs to release the reserved resource,
- wherein the second frame includes the identification information of the first stream,
- wherein the identification information identifies the first stream transmitting through the reserved resource,
- wherein the identification information further indicates the reserved resource for the first stream among the reserved resources for each stream, and
- wherein the first frame is generated when the first communication node is requested to transmit a second stream which has a higher priority than the first stream.

13. An operation method performed in a first communication node of a vehicle network, the method comprising:
- transmitting an advertisement frame, comprising priority information of a first stream, to reserve resource for a first stream;
- generating the first frame comprising identification information based on the priority information of the first stream;
- transmitting the first frame to a second communication node; and
- receiving a second frame configured to indicate a completion of a release of a reserved resource between the first communication node and the second communication node from the second communication node,
- wherein the first frame instructs to release the reserved resource,
- wherein the second frame includes the identification information of the first stream,
- wherein the identification information identifies the first stream transmitting through the reserved resource,
- wherein the identification information further indicates the reserved resource for the first stream among the reserved resources for each stream, and
- wherein the first frame is generated when the second communication node is requested to transmit a second stream which has a higher priority than the first stream.

* * * * *